INVENTOR.
EDWARD V CRANE
and FREDERICK AUER
BY
ATTORNEYS.

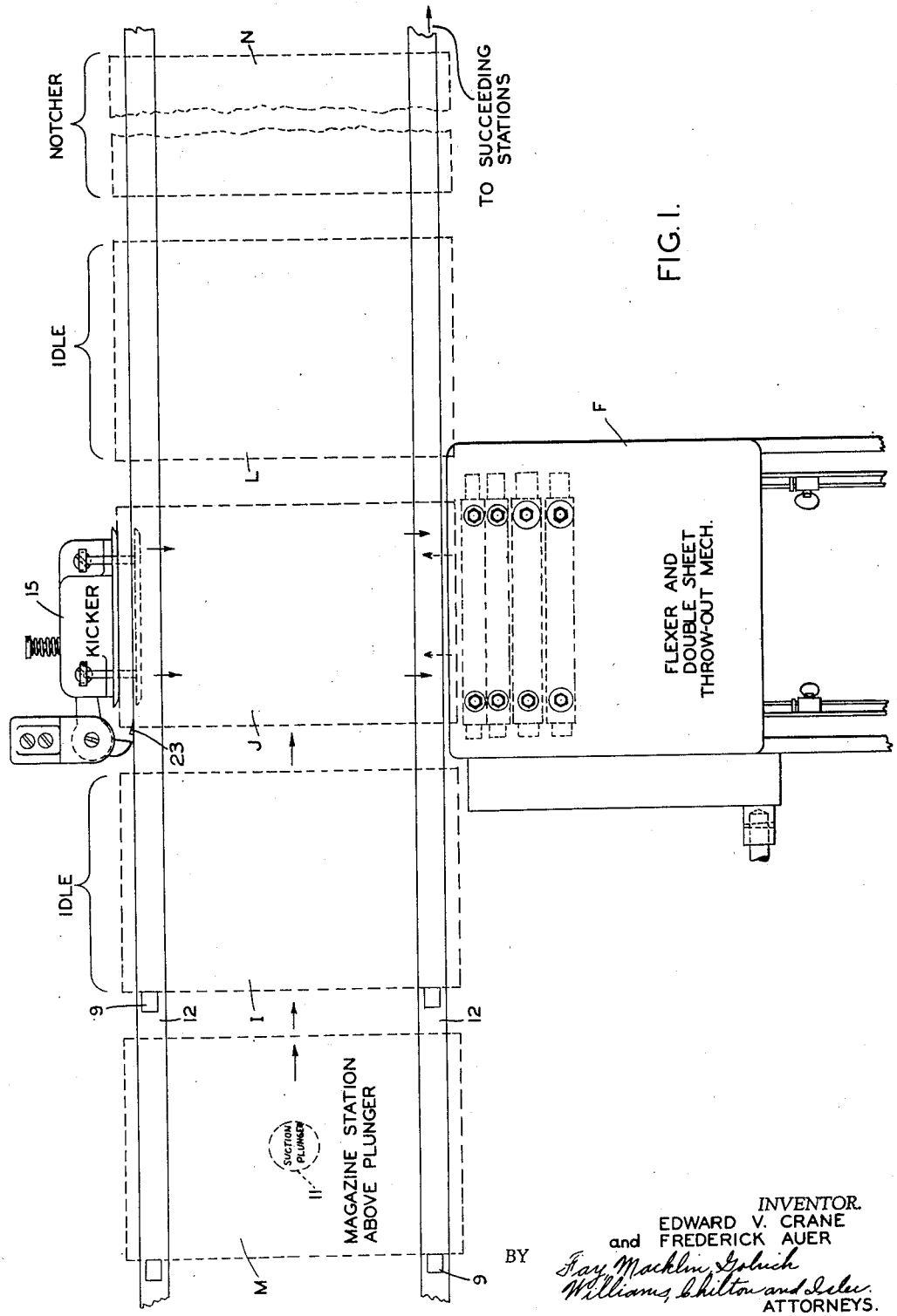

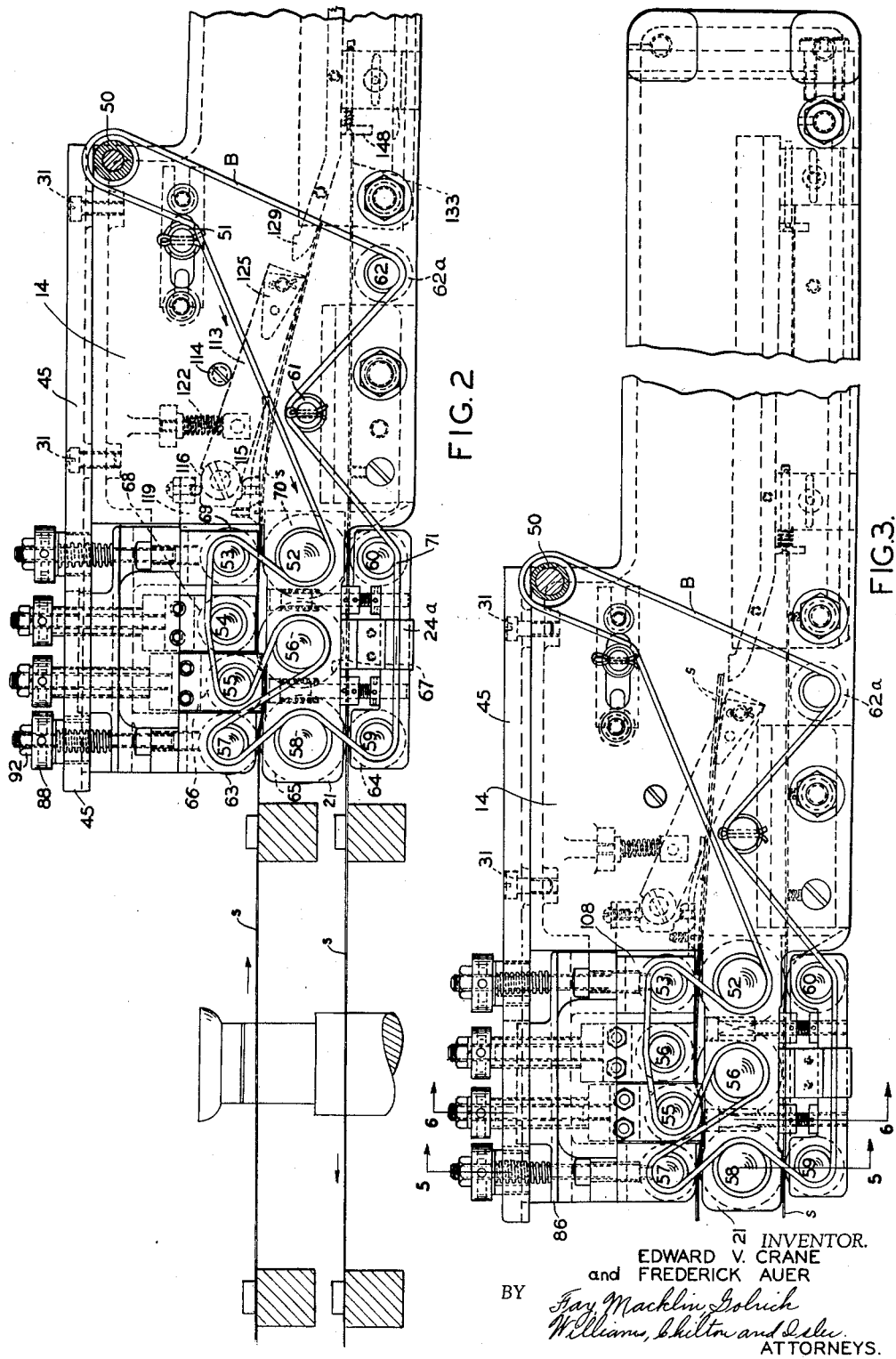

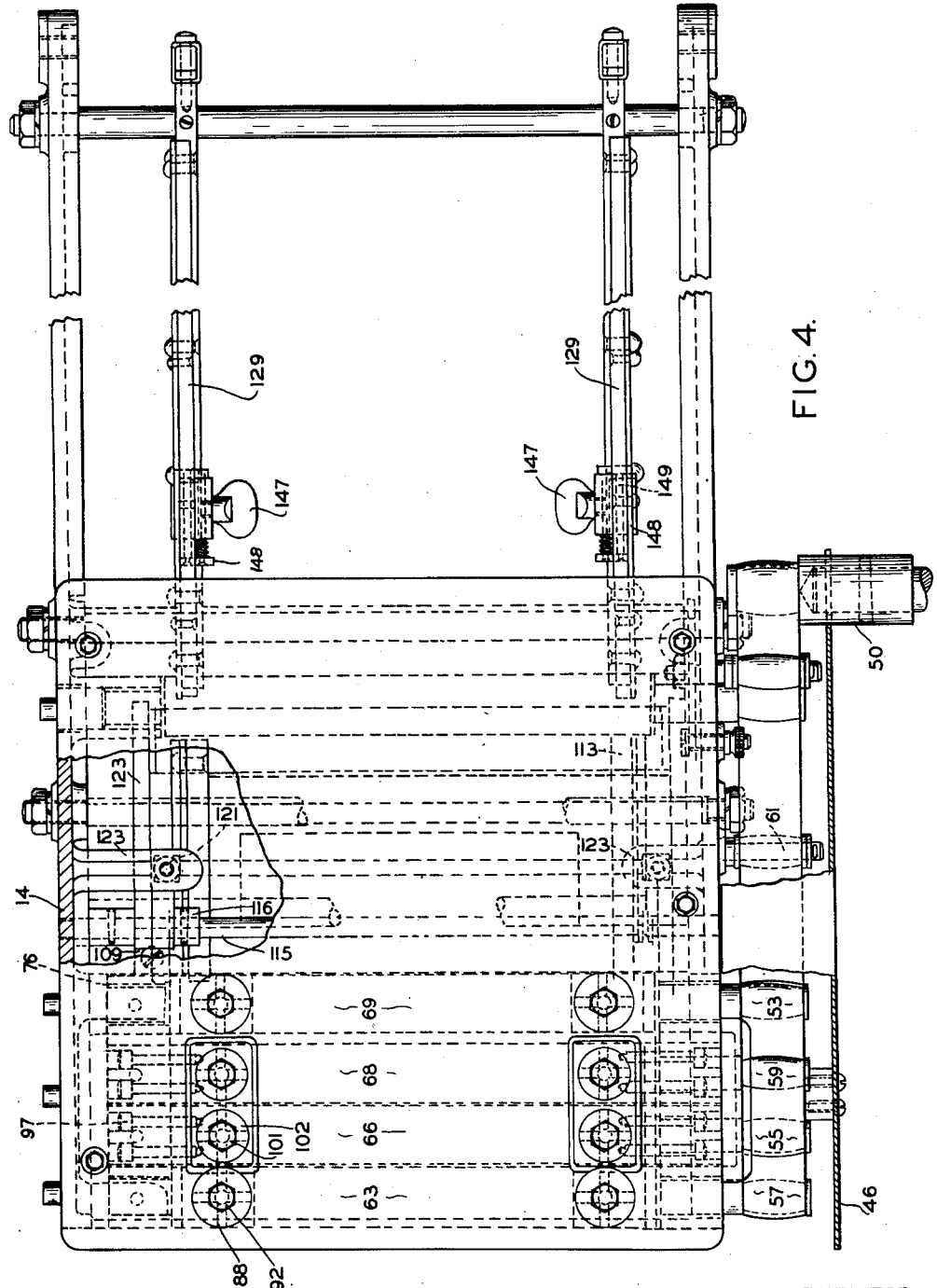

INVENTOR.
EDWARD V. CRANE
and FREDERICK AUER

Patented Feb. 22, 1944

2,342,573

UNITED STATES PATENT OFFICE 2,342,573

SHEET HANDLING MECHANISM

Edward V. Crane, Brooklyn, N. Y., and Frederick Auer, Palisades Park, N. J., assignors to E. W. Bliss Company, Brooklyn, N. Y., a corporation of Delaware Application November 18, 1941, Serial No. 419,590

7 Claims. (Cl. 153—54)

The present invention relates to a sheet handling mechanism and is particularly adapted for handling sheets of metal to condition them for operations in a forming machine. The invention is chiefly concerned with the provisions of properly delivering sheets of metallic can stock to can body makers.

When sheets of metal are to be made into cans they are placed in a magazine and are withdrawn from that magazine as needed. Due to the presence of oil and for other causes two or more sheets will frequently stick together and must either be separated or removed from the apparatus before they reach the fabricating stations. It has been customary to remove the "doubles" as such adhering sheets are called and then if desired separate these "doubles" and run them again through the machine.

As a further step in preparing sheets or blanks for fabrication it is frequently necessary to flex the same to partially strain harden the metal and permit the sheet to be more smoothly wrapped into the shape of a can body.

It is the general object of the present invention to take such sheets as they are removed from the magazine and so handle them that their delivery as single sheets to the forming mechanism is insured. Another object has been to flex the said sheets during this period. Still another object of the invention has been to accomplish the flexing action and the elimination of "doubles" from the single sheets at the same station. A still further object of the invention has been to provide for the feeding of sheets into a forming mechanism at one level, stopping the motion of the sheets, removing them to another level and then in a reverse direction, taking the sheets out of the mechanism.

To the accomplishment of the foregoing and related ends, said invention, then, consists of the means hereinafter fully described and particularly pointed out in the claims; the annexed drawings and the following description setting forth in detail certain mechanism embodying the invention, such disclosed means constituting, however, but one of various forms in which the principle of the invention may be used.

In said annexed drawings:

Fig. 1 is a diagrammatical illustration of the general layout of several stations of a can body maker with the mechanism incorporated therein according to the invention;

Figs. 2 and 3 are side elevations of the blank flexing and separating stations with certain parts removed, one view showing the operation when a single sheet, and the other when a double sheet is passed through;

Fig. 4 is a top view of the same station with some parts broken away;

Referring now to Fig. 1 of the drawings, M designates a magazine station mounted above a suction plunger 11 which pulls the blanks down into engagement with fingers on a pair of feed bars. These fingers feed the blanks over an idle station I to an intermediary station J from where they are pushed horizontally in a direction at right angles from their previous path of travel into the sheet handling station F forming the principal object of the present invention. After the sheets have passed through the station, the single sheets are allowed to travel on through another idle station L to the notching station N and further on to succeeding operating stations.

The sheets or blanks, as stated, travel on movable bars or tracks 12, which are reciprocated by suitable mechanism (not shown). As the tracks are moved in forward direction they feed the blanks by means of fingers 9, which are mounted on the track at regular intervals, from the idle station I to the intermediary station J. On the return stroke other fingers, designated by 13, actuate a kicker mechanism which pushes the blanks from station J to the blank flexing and separating station F, hereafter simply called the handling station.

Figure 7:
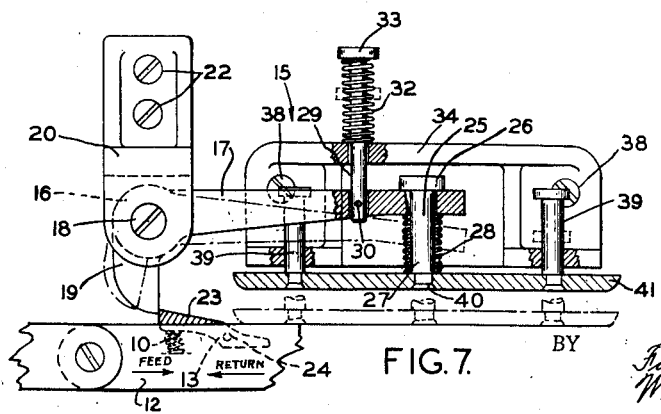
Fig. 7 illustrates on an enlarged scale the so-called kicker mechanism diagrammatically shown in Fig. 1 with parts in section.

As shown in Fig. 7, fingers 13 are pivotally mounted on the track on a pin 24 and their rear end bears on a spring 10 which is likewise fastened to the track. Protruding over the edge of the track is a cam 23 shaped on fingers 13 designed to actuate the kicker mechanism generally designated by numeral 15.

The kicker mechanism comprises a bell crank member 16 having a short arm 19 and a longer arm 17. Member 16 is pivoted on a pin 18 which is mounted between the two sides of a U-shaped bracket 20, the latter being fastened by bolts 22 to the sub-frame of the machine (not shown). The arms 17 and 19 are usually in the position drawn in solid lines and take up the position shown in dotted lines only when shifted by the cam end 23 of fingers 13. When moving in the forward direction, fingers 13 will pass by arm 19, spring 10 being compressed and allowing this passage.

Arm 17 is connected as at 30 with a rod 29 having a spring 32 mounted thereon between a head 33 on said rod and a frame 34. The latter is fastened to the machine frame by two bolts 38. Arm 17 carries near its free end a plunger 25 having a head portion 26 bearing on top of the arm, while its lower end 27 is riveted as at 40 to a plate 41. A spring 28 extends between arm 17 and plate 41 on plunger 25, said spring having a cushioning effect on the kicker action.

Frame 34 has two guide members 39 horizontally and slidably mounted thereon. These members are likewise riveted to the kicker plate 41. Both plates and guide members are shown in solid lines in their normal position. The dotted line position shows the kicker when actuated to push a blank over to the handling station.

The kicker operates as follows: As soon as fingers 13 have reached the position shown in Fig. 7, the track is ready for the return travel and cams 23 will actuate arm 19 to take the position shown in dotted lines. At the same time arm 17 moves over taking along rod 30 and its movement compresses springs 32 and 28. By the action of the latter, bar 41 is kicked to its outer or dotted line position, thus thrusting the passing blank over to the handling station. In the meantime arm 19 has become free to return to its normal position and arm 17 likewise takes up the position shown in solid line being aided to return by the action of spring 32. The intermediary station is then ready to receive the next blank and push it over to the handling station.

The handling station comprises a plurality of rolls, some of which function as gripping rolls, others as flexing rolls. All of the rolls are driven by an endless belt B passing over pulleys rigidly connected to said rolls (Fig. 2).

In Figs. 2 and 3, a main drive pulley 50 is connected to a primary driving source such as an electric motor or the like and from there belt B passes over a tightening pulley 51 to the pulleys on the rolls in the flexing device proper and after having traveled successively over pulleys 52 to 60 in the order shown in the drawings is returned over guide rolls 61 and 62 to pulley 50.

The sheet S arrives at the handling station in the upper position from the left-hand side in Fig. 2 and reaches gripping rolls 63 and 65 by the thrust received from the kicker bar 41. While passing through the gripping rolls and the succeeding rolls 66 to 69 the sheet is first bent in one and then in an opposite direction, the necessary flexing action being performed thereon. Rolls 69 and 70 again act as gripping rolls feeding the blank on to the separating mechanism later to be described.

After having passed the separating mechanism a single sheet is returned through the machine and travels first between gripping rolls 70 and 71 and then out between rolls 64 and 65, as shown by the arrow in Fig. 2, onto the lower bars or table and is fed on to successive operating stations as already mentioned. A double sheet is barred from traveling back by a member 113, as will be explained later on in full particulars.

The flexing and straightening rolls employed in the apparatus of this invention are mounted in the machine in three layers with the rolls of the intermediate layer mounted for rotation without bodily shifting. There are four rolls in the upper layer, the first and last of which are mounted in a carriage adjustable vertically to control the clearance between these rolls and the corresponding intermediate rolls. Shiftably mounted within this same carriage are two other rolls which are adjustable with respect to each other and which are adjustable with respect to the first and last roll. This permits an adjustment of the degree of severity of the flexing operation. It is between the upper and intermediate layer of rolls that the sheet is first fed.

The sheet is fed out of the roll mechanism between the lowermost layer of rolls and the said intermediate rolls. Again, to permit adjustment of the roll bite, the lowermost rolls are mounted in a sub-carriage for adjustment toward and from the said intermediate rolls as desired. The details of this mechanism will now be described.

The rolls just described generally are mounted in a machine frame comprising two side plates 14 having frontally extending portions 21 supported by a foot portion 24a. The stationary rolls 65, 67 and 70 are mounted between the extending portion 21 as later described in connection with Figs. 5 and 6. On top of the side plates a head plate 45 is mounted and fastened to the side plates by bolts 31. Plate 45 covers the whole width of the machine and carries suspending members or carriages in which the bearings of the adjustable rolls 63, 66, 68 and 69 are housed.

Figure 5:
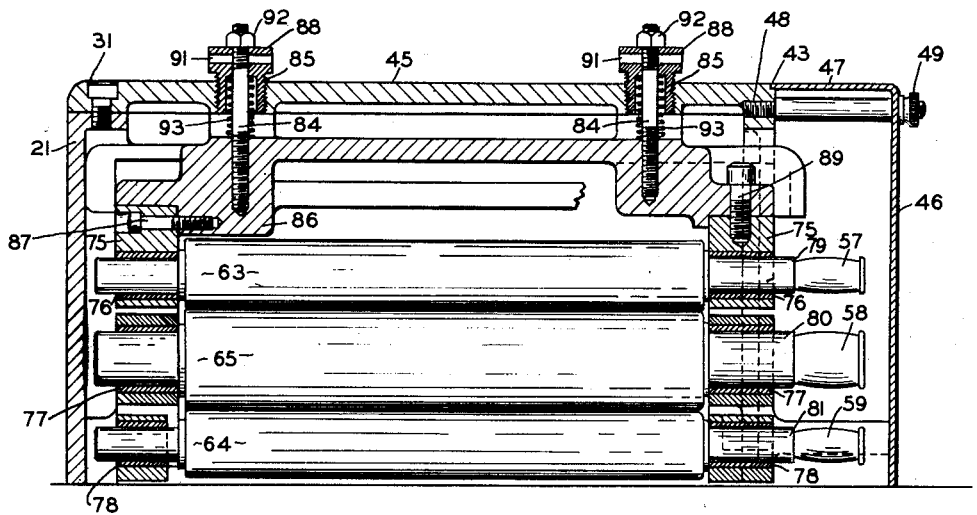
Fig. 5 is a section on the line 5—5 of Fig. 3.
Figure 6:
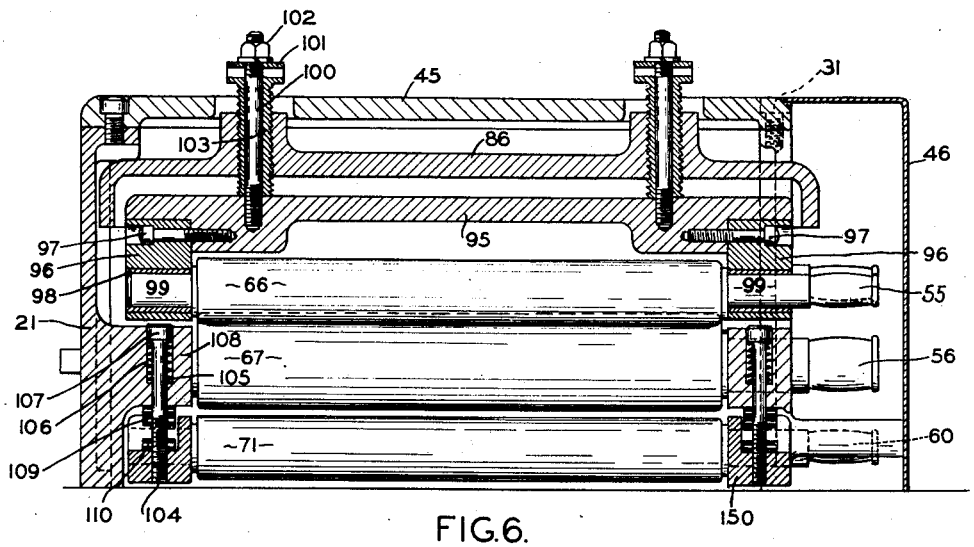
Fig. 6 is a section in line 6—6 of Fig. 3.

The mounting of the rolls is best seen in Figs. 5 and 6. Referring more particularly to the former, Fig. 5 shows the side plate portion 21 of the machine frame and the head plate 45 rigidly fastened thereon. At the right-hand side of the machine a detachable pulley guard 46 is provided, which has a horizontal top portion 47 fitted into a recess 43 of head plate 45 and fastened thereto by a bolt and screw connection 48, 49.

The member for carrying the upper gripping rolls 63 is a casting 86, hereafter called the main carriage. It is suspended fom head plate 45 and connected thereto by threaded studs 84 received in externally threaded cylinders 85 screwed into the head plate 45. The cylinders 85 have enlarged head portions 88 with openings 91 for insertion of a wrench and are in engagement with nuts 92. Springs 93 are mounted on the studs 84 in cylinders 85 bearing against the head portion 88 with one end and against casting 86 at the other end. By loosening or tightening the screw connection the roll 63 is adjusted with respect to the roll 65 according to the thickness of the sheet the two rolls are to grip.

That portion of the machine frame in which the bearing 76 for roll 63 is mounted is designated by 75, said portion being connected to the casting 86 at one side by means of a bolt 87, at the other side by a bolt 89. The bearing receives a neck portion of rolls 63, which neck portion is directly connected with pulley 57 in turn driven by belt B.

In a manner similar to that described in connection with roll 63, rolls 65 and 64 are journalled in bearings 77 and 78 by means of neck portions 80 and 81, respectively, and driven by their associated pulleys. Roll 65, as mentioned above, is mounted in a fixed position with respect to the machine frame, but roll 64 is adjustable. Fig. 6 shows the way this adjustment is accomplished for the similarly mounted roll 71, which likewise illustrates the adjustment of roll 64.

Fig. 6 again illustrates the side plate 21, in which the stationary middle roll 67 is mounted as described above in connection with roll 65 and the main carriage 86. It further shows a sub-carriage for adjustably mounting breaker roll 66, said sub-carriage comprising a casting 95 which, together with casting 86, is detachably connected by means of threaded studs 100. These studs are mounted similarly to studs 84 (Fig. 5) in externally threaded cylinders 103, having head portions 101 and nuts 102 bearing thereon. The bearing 98 for neck portion 99 of roll 66 is received in a frame plate 96 bolted to casting 95 as at 97.

As seen in Figs. 2 and 3 rolls 66 and 68 which are mounted in exactly the same manner may be adjusted independently of each other and of the other rolls.

Bottom roll 71 is mounted in a carriage 150, called the under carriage, which is suspended from a shoulder 108 of side plate extension 21. This shoulder has a bore 106 formed therein to receive the upper part of a threaded stud 104 with a head 107, against which a spring 105 abuts, which bears with the lower end at the bottom of bore 106. Nuts 109 and 110 serve to hold the stud in place. This adjustable mounting of under carriage 150 allows rolls 64 and 71 to be separated from the middle rolls to allow passage of sheets therebetween.

The upper straightening roll 69 is mounted in the main carriage in a manner similar to roll 63 and is likewise cushioned by a spring. The bearing for this roll is carried in a separate block 75a which is integrally formed with a bracket 119 of the double sheet throw-out mechanism now to be described.

Figure 8:
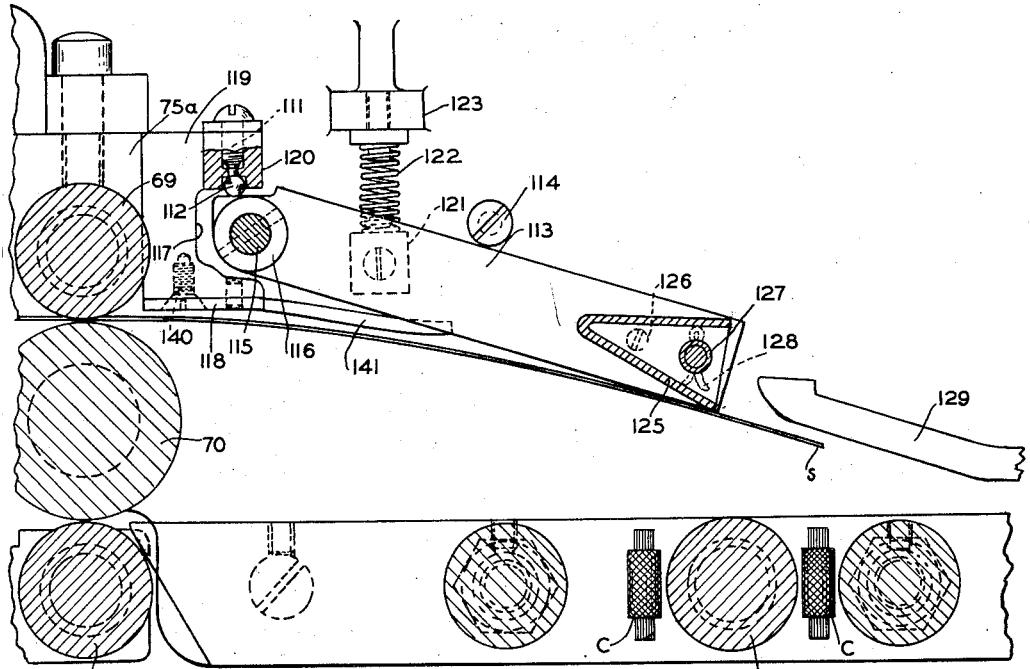
Figs. 8 and 9 show likewise on an enlarged scale the separating mechanism proper, when acting on a single and double sheet respectively.
Figure 9:
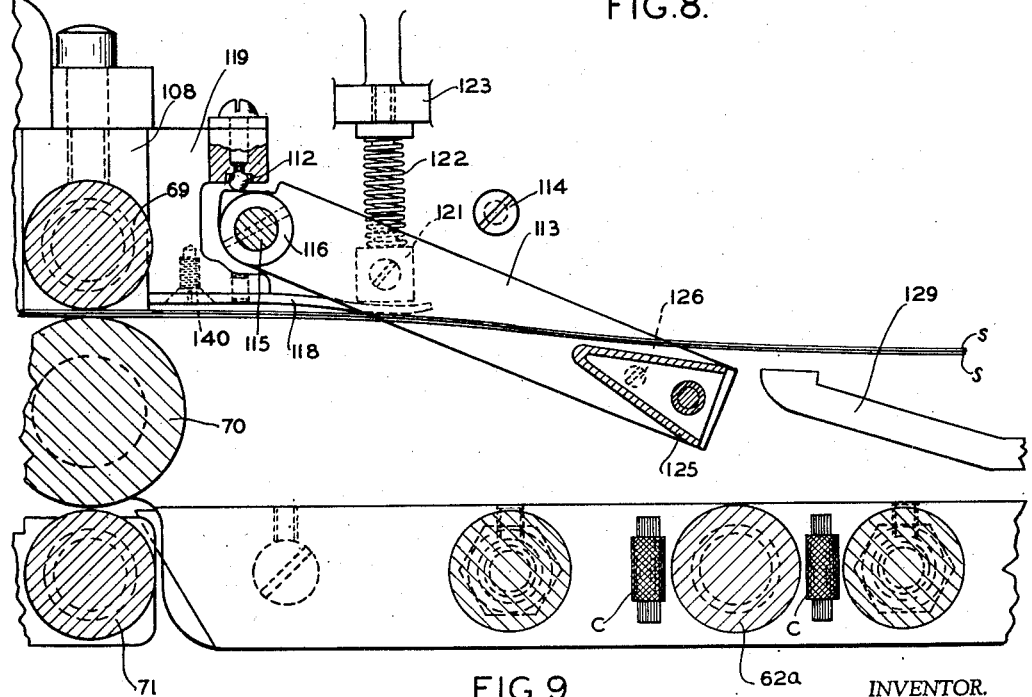

As outlined above, the double sheet throw-out mechanism is a cardinal feature of the present invention. This generally comprises a deflector 125, hereinafter described, which is shifted between two positions, one of which separates the doubles from the general run of sheets and the other position guides the single sheets in a continuous path. The shifting of the deflector is controlled by registering the extra thickness due to two or more sheets adhering together. Since one type of sheet used with the present invention averages about .010 of an inch in thickness, it will be apparent that the control mechanism to be described is accurate in operation and delicate in response. This double sheet throw-out mechanism is shown on an enlarged scale in Figs. 8 and 9 and as seen in Fig. 4 it is pivotally mounted in pivots at each side of the machine.

As already mentioned blocks 75a on which roll 69 is mounted are integrally formed with a bracket 119 having a block shaped portion 120 in which a screw 111 is housed. Partly seated within and partly protruding from said block is a small hardened ball 112 the exact position of which is determined by adjustment of screw 111. Ball 112 bears on the horizontal portion of a pair of twin lever members 113, the pressure of ball 112 being applied adjacent to and behind the point where the levers 113 are pivoted at 116 on a shaft 115 which extends across the machine. Bracket 119 has an opening 117 cut out to accommodate the bearing and to allow of a pivoting movement of the lever 113. At the bottom part bracket 119 carries a guide member 118, screwed thereto at 140, with a guide shoe 141 at its free end.

A spring 122, to normally urge the levers 113 downwardly, is mounted to bear against a laterally projecting block 121 loosely fastened by its bolt on lever 113 to allow of a slight pivoting movement compensating the movement of lever 113. The upper end of the spring engages a stepped portion of a bracket 123 supported on the machine frame casting.

To guide single or double sheets as the case may be, levers 113 carry on their ends a V-shaped guide member or deflector 125 which is adjustably mounted by bolt 126 and a tie-rod 127 extending through the machine and connecting the lever members 113 at either side thereof. The tie-rod is fastened to the levers 113 by cotter pins 128. A stop 114, rigidly fastened to the side plate 14, prevents excessive upward movement of the deflector.

To receive the single sheets as they leave the rolls and pass beneath the deflector 125 a pair of guide rails 129 are provided. These act to direct the forward edge of each sheet down against a pair of resiliently mounted stops 148. These stops act as cushions to bring the sheet to rest and position it for travel in a reverse direction through the lower set of rolls. In order to accommodate sheets of varying length each of the stops may be adjusted to a variety of positions by means of wing nuts 147 and slots 149.

To insure proper feeding of the sheet in its return travel the roll 62a carried on the shaft of the pulley 62 is operated in conjunction with an electro-magnetic force to hold the sheets down against the roll to provide a gripping engagement therewith as the roll is rotated. This feature is of course available only when the sheets fed are subject to magnetic attraction, but many of the uses contemplated for the apparatus involve the use of thin steel sheets, such as tin can body blanks.

Mounted on each side of the roll 62 and extending axially thereof is an elongated laminated transformer core suitably wound with insulated wire, the energization of which establishes a magnetic flux field through the core and through the roll 62 itself. The design of this unit is so arranged that the flux lines travel more or less vertically of the path of travel of the sheet and thus exert their greatest force to draw the sheet down against the roll. Thus, as the roll is rotated and the sheet held against it, it is fed from the stops 148 in a direction opposite to that in which it had been traveling to be received between the intermediate rolls and the lower rolls and discharged from the machine.

In operation the sheet deflecting mechanism operates as follows: If a single sheet passes between the rolls 69 and 70 out toward the deflector 125 it will be guided down beneath the rails 129. This is because the aforesaid rolls have been adjusted to correspond to the thickness of the sheet being fed. The sheet will then strike the stops 148 and be brought to rest. It will then be picked up by the magnetic roller 62 and fed back between the sets of rolls 70 and 71 and 64 and 65 as already mentioned.

If a "double" passes through rolls 69 and 70 the first mentioned roll will be raised a distance equivalent to the thickness of the extra sheet. This will in turn raise the ball mounts and the balls 112 by the same amount. Due to the leverage effective through the levers 113 about their pivots 115 the deflector 125 will drop from the position shown in Fig. 8 to the position shown in Fig. 9. In such case the "double" will be discharged over the top of the rails 129 and removed from the mechanism.

Any tendency of the levers 113 to bind and remain in an upward position is eliminated by the action of the light springs 122 which, as aforementioned, are held between the bosses 121 and the projections 123.

While I have described my improved mechanism, comprising the kicker for feeding the blanks to the flexing station and the throw-out mechanism for separating the double sheet, in connection with a can body maker, it will be understood that these devices may be readily used in a sheet handling machine of some other kind, where a sheet is treated at several operating stations and separation of single and double sheets is of importance.

Other modes of applying the principle of our invention may be employed instead of the one explained, change being made as regards the mechanism herein disclosed, provided the means stated by any of the following claims or the equivalent of such stated means be employed.

We therefore particularly point out and distinctly claim as our invention:

1. In a can body maker a combined flexing and double sheet throw-out station, means in said station for detecting double sheets, guide means normally set to direct single sheets over a return path through said station, said guide means being mechanically operable by said detecting means to divert double sheets out of said station, means to reset said guide means after ejection of double sheets, a plurality of adjustably mounted upper rolls comprising two gripping rolls and two breaker rolls, a plurality of carriages suspended on the machine frame, said carriages corresponding in number to said rolls, and being adapted to receive said rolls for independent adjustment, a plurality of stationary center rolls adapted to cooperate with said upper rolls in feeding the sheets through the station in one direction while performing a flexing operation on the same and in passing the sheets to the double sheet throw-out mechanism, and a plurality of bottom rolls likewise mounted for independent adjustment, a plurality of carriages suspended from the machine frame for receiving said bottom rolls, said latter rolls being adapted to cooperate with said center rolls for feeding the single sheets back through said station over the return path.

2. In a can body maker a combined flexing and double sheet throw-out station comprising a plurality of adjustably mounted upper rolls, a set of stationary rolls adapted to cooperate with said adjustable rolls for feeding the sheet metal through the station in one direction while performing a flexing operation on the same, means directly connected to the last of the adjustable rolls for detecting double sheets, sheet guiding mechanism associated with said detecting means, said mechanism comprising a pair of pivotally mounted levers, hold-down members for normally pressing down the one end of said levers beyond the fulcrum, said hold-down members being operatively connected with said double sheet detecting means, both said means and said hold-down members being lifted by excess thickness of a double sheet to release the pressed lever ends and enable the free lever ends to take up a down position whereby said levers are capable of diverting double sheets out of said station.

3. In a can body maker a combined flexing and double sheet throw-out station comprising a plurality of adjustably mounted upper rolls, a set of stationary rolls adapted to cooperate with said adjustable rolls for feeding the sheets through the station in one direction while performing a flexing operation on the same, means actuated by the last of the adjustable rolls for detecting double sheets, a sheet guiding means connected to and operable by said detecting means, said sheet guiding means comprising a pair of pivotally mounted levers, spring means acting on said levers to urge down the free lever ends, hold-down members secured to said double sheet detecting means, adapted normally to press down one of the lever ends thereby holding up the free lever ends and enabling said levers to direct single sheets over a return path through said station, said detecting means and said hold-down members being lifted by excess thickness of a double sheet to release said pressed lever ends thereby actuating said free lever ends to take up a down position and thereby to divert double sheets out of the machine.

4. In a can body maker a combined flexing and double sheet throw-out station comprising a plurality of adjustably mounted upper rolls, a set of stationary rolls adapted to cooperate with said adjustable rolls for feeding the sheets through the station in one direction while performing a flexing operation on the same, means actuated by the last of the adjustable rolls for detecting double sheets, a sheet guiding means directly connected to and operable by said detecting means, said sheet guiding means comprising a pair of pivotally mounted levers, hold-down members secured to said double sheet detecting means, adapted normally to press down one of the lever ends thereby holding up the free lever ends, spring means acting on said levers to urge downwardly the free lever ends, members secured to the free lever ends for directing single sheets to pass underneath said levers, a stop member for bringing said single sheets to a standstill, a set of rolls for returning said single sheets through the station, said detecting means and said hold-down members being lifted by excess thickness of a double sheet to release said pressed lever ends thereby actuating said free lever ends to take up a down position, said double sheets being directed by said members secured to the free lever ends to pass over the top of said levers out of the machine.

5. In a sheet handling machine, a combined flexing and double sheet throw-out station comprising a plurality of adjustably mounted flexing and gripping rolls, a set of stationary rolls adapted to cooperate with said adjustable rolls for feeding the sheets through the station in one direction while performing a flexing operation on the same, means for detecting double sheets, said detecting means having means for operatively connecting it with one of said adjustable rolls, a guide operated by said detecting means, means on the detector to support said guide means to direct single sheets to travel over a return path through said station, and means to mechanically operate the said detecting means to bar said return path to double sheets and divert them out of said station.

6. In a can body maker, a combined flexing and double sheet throw-out station comprising a set of flexing rolls, means for mounting said rolls to be movable toward and away from one another independently of each other, a set of stationary rolls adapted to cooperate with said adjustable rolls for feeding the sheet through the station in one direction while performing a flexing operation on the same, means directly connected to one of the rolls in the last set thereof for detecting double sheets, a guide means normally set to direct single sheets to travel over a return path through said station, and means operatively inter-connecting the guide means and detecting means to allow said guide means to fall below its normal position as the detector carrying roll is lifted to thereby take up a position to bar said return path to double sheets and divert them out of the station.

7. In a sheet handling machine, a combined flexing and double sheet throw-out station including movable flexing rolls, a mechanism in said double sheet throw-out station comprising detecting means for double sheets, a pair of abutment members carried by said detecting means, a pair of pivotally mounted levers having their fulcrums disposed to one side of said abutment members and carrying a deflector thereon, said members normally engaging the ends of said levers to said one side of the fulcrum to hold the opposite end of the levers and the deflector in an elevated position to permit passage of single sheets through said station, means for connecting said detector mechanism to one of said movable rolls whereby the abutments are lifted as the roll rises under the influence of a double sheet to permit the guide to drop to a position to divert said double sheets out of the station.

EDWARD V. CRANE.
FREDERICK AUER.